(12) United States Patent
Saito

(10) Patent No.: US 9,772,084 B2
(45) Date of Patent: Sep. 26, 2017

(54) HEADLIGHT HAVING A DIVISION SCAN OPTICAL SYSTEM

(71) Applicant: Stanley Electric Co., Ltd., Tokyo (JP)

(72) Inventor: Takao Saito, Tokyo (JP)

(73) Assignee: STANLEY ELECTRIC CO., LTD., Tokyo (JP)

(*) Notice: Subject to any disclaimer, the term of this patent is extended or adjusted under 35 U.S.C. 154(b) by 0 days.

(21) Appl. No.: 15/123,903

(22) PCT Filed: Feb. 5, 2015

(86) PCT No.: PCT/JP2015/053285
§ 371 (c)(1),
(2) Date: Sep. 6, 2016

(87) PCT Pub. No.: WO2015/146309
PCT Pub. Date: Oct. 1, 2015

(65) Prior Publication Data
US 2017/0016588 A1 Jan. 19, 2017

(30) Foreign Application Priority Data
Mar. 25, 2014 (JP) ................... 2014-061823

(51) Int. Cl.
*F21S 8/10* (2006.01)
*B60Q 1/076* (2006.01)
(Continued)

(52) U.S. Cl.
CPC .......... *F21S 48/1757* (2013.01); *B60Q 1/076* (2013.01); *B60Q 1/08* (2013.01);
(Continued)

(58) Field of Classification Search
CPC ............... F21S 48/1757; F21S 48/1145; F21S 48/1388; B60Q 1/076
See application file for complete search history.

(56) References Cited

U.S. PATENT DOCUMENTS

2003/0179428 A1* 9/2003 Suzuki ................ B41J 2/473
359/204.2
2012/0120470 A1* 5/2012 Kitazawa ............... H02N 1/006
359/200.1
(Continued)

FOREIGN PATENT DOCUMENTS

| JP | 2013-8480 A | 1/2013 |
| JP | 2013-182837 A | 9/2013 |
| JP | 2014-53184 A | 3/2014 |

OTHER PUBLICATIONS

International Search Report for PCT/JP2015/053285 dated Apr. 28, 2015.

*Primary Examiner* — Karabi Guharay
(74) *Attorney, Agent, or Firm* — Kenealy Vaidya LLP

(57) ABSTRACT

A system can include: a dividing unit which divides a light scanning within a rotation angle range into a right scan light of a first angle portion and a left scan light of a second angle portion; a right-side scan light generation unit which reflects the right scan light toward a right-side region portion of an irradiation region; and a left-side scan light generation unit which reflects the left scan light toward a left-side region portion of the irradiation region. Both end fields of the region are irradiated by the light from the middle part of the rotation angle range. A center field of the region is irradiated by the light from the end parts of the rotation angle range.

7 Claims, 9 Drawing Sheets

(51) Int. Cl.
*G02B 26/10* (2006.01)
*G02B 19/00* (2006.01)
*B60Q 1/08* (2006.01)
*B60Q 1/14* (2006.01)

(52) U.S. Cl.
CPC ......... *F21S 48/1145* (2013.01); *F21S 48/125* (2013.01); *F21S 48/1225* (2013.01); *F21S 48/1388* (2013.01); *G02B 19/0028* (2013.01); *G02B 19/0052* (2013.01); *G02B 26/105* (2013.01); *B60Q 1/143* (2013.01); *B60Q 2300/134* (2013.01)

(56) References Cited

U.S. PATENT DOCUMENTS

2012/0243065 A1* 9/2012 Koyama .............. F21S 48/1145
  359/199.4
2013/0094235 A1 4/2013 Sugiyama et al.
2014/0071706 A1 3/2014 Yagi et al.

* cited by examiner

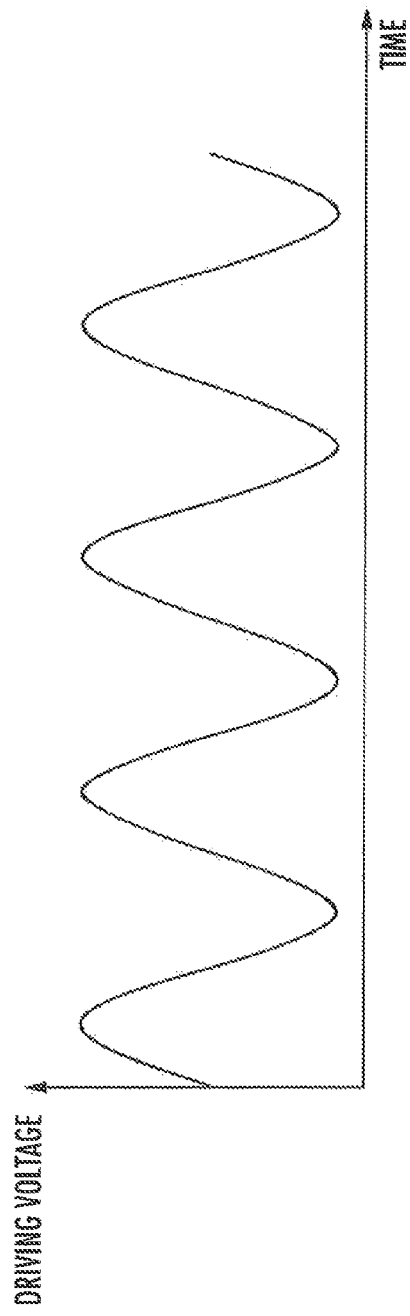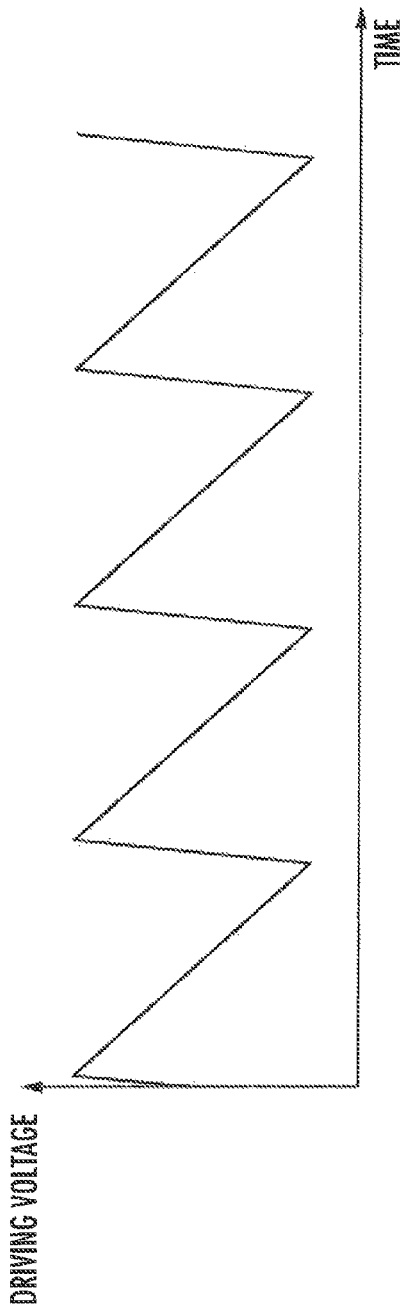

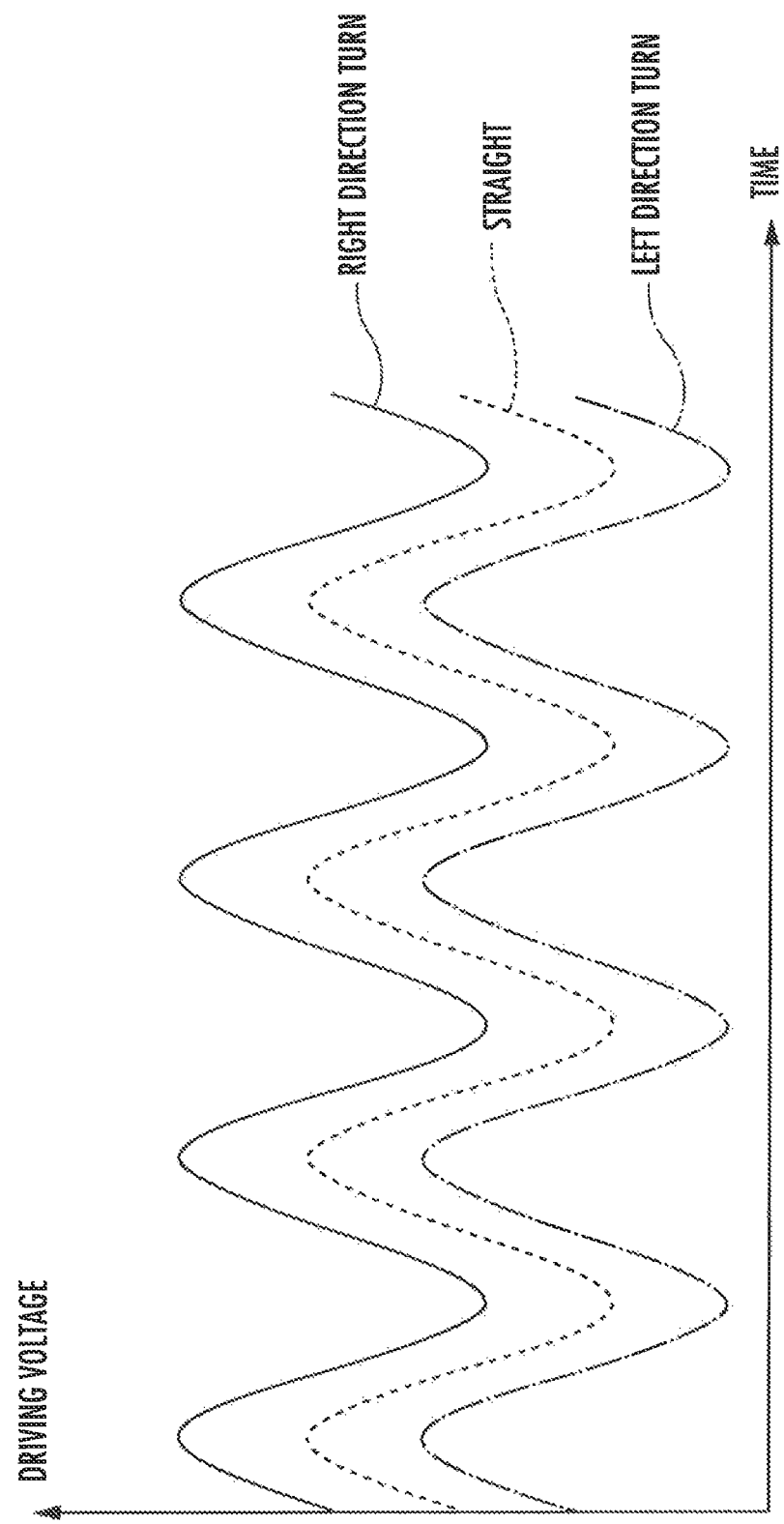

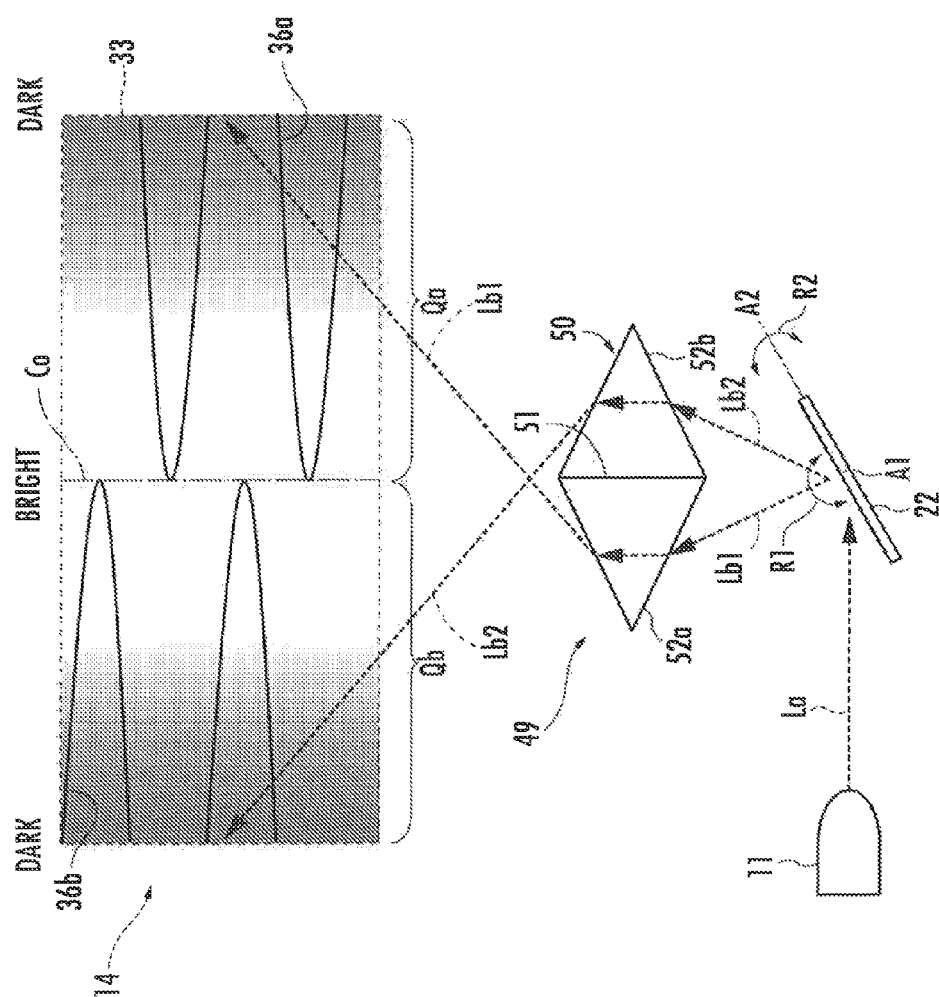

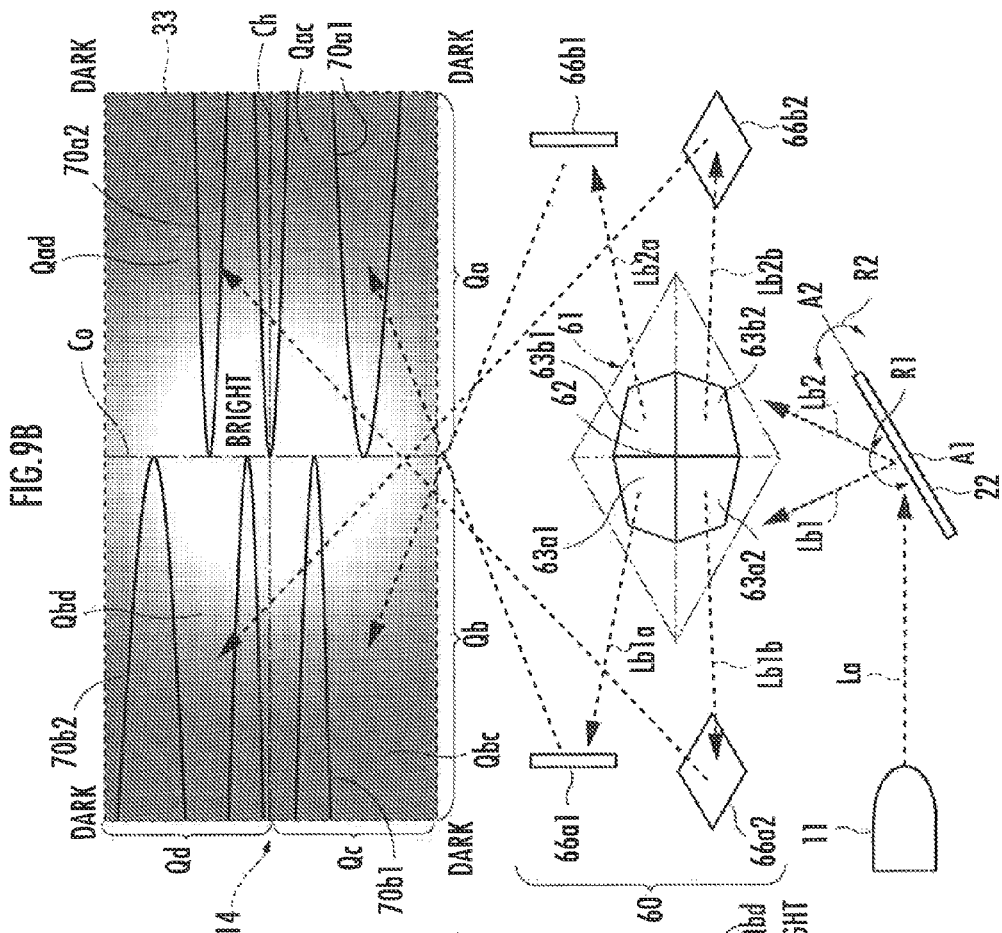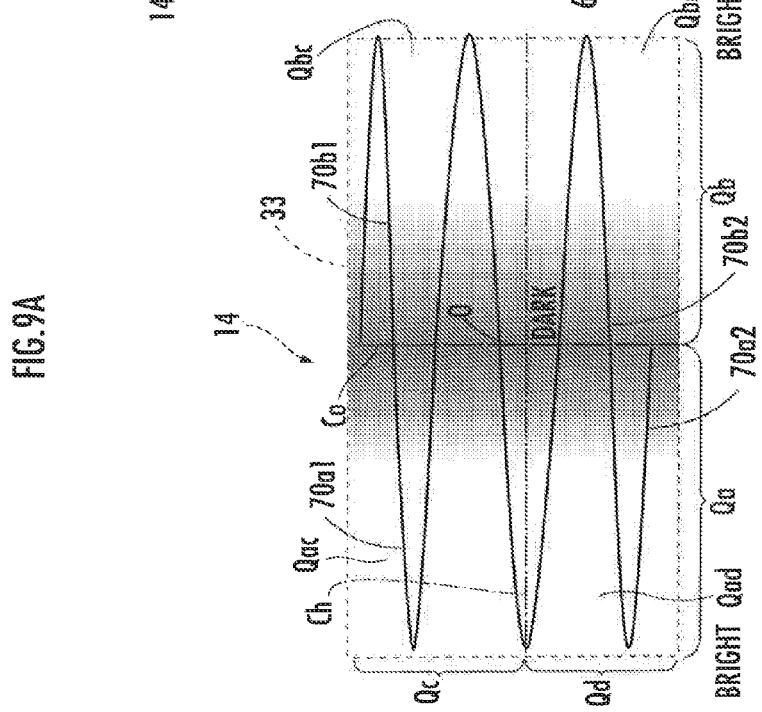

HEADLIGHT HAVING A DIVISION SCAN OPTICAL SYSTEM

This application is a U.S. national phase filing under 35 U.S.C. §371 of PCT Application No. PCT/JP2015/053285, filed February 5, 2015, and which in turn claims priority under 35 U.S.C. §119 to Japanese Patent Application No. JP2014-061823, filed March 25, 2014, the entireties of which are incorporated by reference herein.

TECHNICAL FIELD

The present invention relates to a headlight equipped on a movable body such as a vehicle.

BACKGROUND ART

A headlight equipped with an optical deflector manufactured by using MEMS (Micro Electro Mechanical Systems) technology is known (e.g.: Patent Literature 1).

The optical deflector equipped in the headlight in Patent Literature 1 has a reflection unit for reflecting light and an actuator driven by a driving voltage and reciprocating and rotationally moving the reflection unit around two rotation axes orthogonal to each other. According to this optical deflector, the light incident to the reflection unit from a laser light source or the like is reflected by the reflection unit reciprocated and rotationally moved around the two rotation axes and is emitted toward an irradiation region in front. By means of this light, the irradiation region in front is scanned in a horizontal direction and a vertical direction.

In order to reciprocating and rotationally moving the reflection unit at a predetermined frequency (the frequency of the reciprocating and rotational movement of the reflection unit is equal to a scan frequency of scan light), the actuator is driven by a voltage with a waveform expressed by a sinusoidal wave or sawtooth wave in general.

CITATION LIST

Patent Literature

Patent Literature 1: Japanese Patent Laid-Open No. 2013-8480

SUMMARY OF INVENTION

Technical Problem

A rotation angle of the reflection unit around the rotation axis corresponds to the driving voltage of the actuator, and a speed of a change in the rotation angle is in proportion to a temporal differentiation (change amount per unit time) of the driving voltage of the actuator. Therefore, the scan light scanning the irradiation region in the horizontal direction reverses a direction in the horizontal direction as a scan direction at a turning point of the driving voltage, and the scan speed at each point of time of the scan light is in proportion to the temporal change of the driving voltage of the actuator.

In prior-art headlights, if the actuator of the optical deflector equipped in the headlight is driven by a waveform voltage such as a sinusoidal wave or a sawtooth wave, the scan light with the horizontal direction as a scan direction has its scan speed lowered at both end portions of the irradiation region in the horizontal direction and increased at a center part in the horizontal direction. That is, the center part in the irradiation region in the horizontal direction is dark, while the both ends in the horizontal direction are bright. This is opposite to a desirable light distribution pattern.

An object of the present invention is to generate a light distribution pattern in which a center part of the irradiation region is bright and end portions are dark in the headlight that scans the irradiation region by generating the scan light by the optical deflector.

Solution to Problem

A headlight of the present invention has a light source, an optical deflector which has a reflection unit reflecting light from the light source and an actuator unit driven by first and second driving voltages and reciprocating and rotationally moving the reflection unit around orthogonal first and second rotation axes, the optical deflector emitting reflection light while reciprocating and rotationally moving the reflection light from the reflection unit within first and second rotation angle ranges by rotational movement of the reflection unit around the first and second rotation axes, and an optical system which emits the reflection light emitted from the optical deflector within the first and the second rotation angle ranges as scan light which scans an irradiation region in a horizontal direction and a vertical direction. The optical system has a dividing unit which divides the reflection light within the first rotation angle range into the reflection light of a first angle portion from one end angle to an intermediate angle of the first rotation angle range and the reflection light of a second angle portion from the intermediate angle to the other end angle of the first rotation angle range, a right-side scan light generation unit which advances the reflection light which is the closer to the one end angle in the reflection light of the first angle portion on a left side in the horizontal direction and emits it as scan light which scans a right-side region portion of the irradiation region in the horizontal direction and a left-side scan light generation unit which advances the reflection light which is the closer to the other end angle in the reflection light of the second angle portion on a right side in the horizontal direction and emits it as the scan light which scans a left-side region portion of the irradiation region in the horizontal direction.

According to the present invention, the first rotation angle range of the reflection light from the optical deflector is divided into the reflection light of the first angle portion from the one end angle to the intermediate angle and the reflection light of the second angle portion from the intermediate angle to the other end angle, and the reflection light which is the closer to the one end angle of the first angle portion is made the scan light which advances on the left side in the horizontal direction and emitted as the scan light which scans the right-side region portion of the irradiation region in the horizontal direction. The reflection light which is the closer to the other end angle of the second angle portion is made the scan light which advances on the right side in the horizontal direction and emitted as the scan light which scans the left-side region portion of the irradiation region in the horizontal direction.

As a result, a center part of the irradiation region is scanned by the scan light of the one end angle and the other end angle within the first rotation angle range, while left and right end portions of the irradiation region are scanned by the scan light of the intermediate angle within the first rotation angle range, respectively. The reflection light of the one end angle and the other end angle within the first rotation angle range has a low scan speed and is bright, while the reflection light of the intermediate angle within the first rotation angle range has a high scan speed and is dark. Therefore, a light distribution pattern in which the center part in the irradiation region is bright and the end portions are dark can be generated in the horizontal direction.

In the headlight of the present invention, it is preferable that the dividing unit is a V-shaped mirror which reflects the reflection light of the first angle portion by one of reflective surfaces and reflects the reflection light of the second angle portion by the other reflective surface, and the right-side scan light generation unit is a mirror for the first angle portion which reflects the reflection light from the one reflective surface of the V-shaped mirror toward the right-side region portion, while the left-side scan light generation unit is a mirror for the second angle portion which reflects the reflection light from the other reflective surface of the V-shaped mirror toward the left-side region portion.

According to this configuration, the dividing unit, the right-side scan light generation unit, and the left-side scan light generation unit of an optical portion can be realized without trouble by using the V-shaped mirror and the mirrors for the first and second angle portions.

In the headlight of the present invention, it is preferable that a prism having a diamond sectional shape is provided, and one of half portions of the diamond sectional shape in the prism has the reflection light of the first angle portion from the optical deflector incident thereto and emits the incident reflection light toward the right-side region portion so as to serve both as the dividing unit and the right-side scan light generation unit, while the other half portion of the diamond sectional shape in the prism has the reflection light of the second angle portion from the optical deflector incident, and emits the incident reflection light toward the left-side region portion so as to serve both as the dividing unit and the left-side scan light generation unit.

According to this configuration, the dividing unit, the right-side scan light generation unit, and the left-side scan light generation unit of the optical portion can be realized without trouble by using the prism having a diamond-shaped section.

In the headlight of the present invention, the intermediate angle is preferably set to the rotation angle at the center of the first rotation angle range.

According to this configuration, the both end portions of the irradiation region in the horizontal direction are irradiated with the scan light of the darkest rotation angle in the first rotation angle range. As a result, a contrast between the center part and the both ends of the irradiation region in the horizontal direction can be increased.

In the headlight of the present invention, preferably, the first driving voltage is a sinusoidal wave, and a driving voltage supply unit is provided for adjusting a center voltage and amplitude of the first driving voltage and supplying it to the actuator unit.

According to this configuration, by adjusting the center voltage and the amplitude of the first driving voltage with the sinusoidal wave, the intermediate angle, the one end angle, and the other end angle of the first rotation angle range are changed. As a result, the irradiation region and the brightest portion in the irradiation region can be displaced in the horizontal direction. This is useful in control of the light distribution pattern while a vehicle is turning, for example.

In the headlight of the present invention, the optical system preferably has another dividing unit which divides the reflection light within the second rotation angle range into the reflection light of a third angle portion from another one end angle to another intermediate angle of the second rotation angle range and the reflection light of a fourth angle portion from the other intermediate angle to yet another end angle of the second rotation angle range, a lower-side scan light generation unit which advances the reflection light of the third angle portion which is the closer to the other one end angle on an upper side in a vertical direction and emits it as scan light which scans a lower-side region portion of the irradiation region in the vertical direction, and an upper-side scan light generation unit which advances the reflection light of the fourth angle portion which is the closer to the yet another end angle on a lower side in a vertical direction and emits it as scan light which scans an upper-side region portion of the irradiation region in the vertical direction.

According to this configuration, the second rotation angle range of the reflection light from the optical deflector is divided into the reflection light of the third angle portion from the other one end angle to the other intermediate angle and the reflection light of the fourth angle portion from the other intermediate angle to the yet another end angle, and the reflection light which is the closer to the other one end angle of the third angle portion is made the scan light which advances on the upper side in the vertical direction and is emitted as the scan light which scans the lower-side region portion of the irradiation region in the vertical direction. Moreover, the reflection light which is the closer to the yet another end angle of the fourth angle portion is made the scan light which advances on the lower side in the vertical direction and is emitted as the scan light which scans the upper-side region portion of the irradiation region on the lower side in the vertical direction.

As a result, the center part in the irradiation region is scanned by the scan light of the other one end angle and the yet another end angle of the second rotation angle range, and the left and right end portions of the irradiation region are scanned by the scan light of the other the intermediate angle of the second rotation angle range. The reflection light of the other one end angle and the yet another end angle within the second rotation angle range has a low scan speed and is bright, while the reflection light of the other intermediate angle within the second rotation angle range has a high scan speed and is dark. Therefore, the light distribution pattern in which the center part of the irradiation region is bright and the end portions are dark can be generated in the vertical direction.

In the headlight of the present invention, it is preferable that the second driving voltage is a sinusoidal wave or the sawtooth wave, and another driving voltage supply unit which adjusts the center voltage and the amplitude of the second driving voltage and supplies it to the actuator unit is provided.

According to this configuration, by adjusting the center voltage and the amplitude of the second driving voltage which is the sinusoidal wave or the sawtooth wave, the other intermediate angle, the other one end angle, and the yet another end angle of the second rotation angle range are changed. As a result, the irradiation region and the brightest portion in the irradiation region can be displaced in the vertical direction. This is useful in control of switching between a high beam and a low beam in accordance with detection of a monitoring target, for example.

BRIEF DESCRIPTION OF THE DRAWINGS

FIG. 3A and FIG. 3B are waveform diagrams of a driving voltage supplied to a piezoelectric film of an actuator of the optical deflector, in which FIG. 3A is a waveform diagram of a sinusoidal wave driving voltage, while FIG. 3B is a waveform diagram of a sawtooth wave driving voltage.

FIG. 7 is a diagram illustrating a waveform of a driving voltage supplied to a piezoelectric film of a horizontal scan actuator for obtaining the light distribution pattern in FIG. 6.

FIG. 8 is a configuration diagram of another division scan optical system.

FIG. 9A and FIG. 9B are explanatory diagrams of a four-division scan optical system, in which FIG. 9A is an explanatory diagram of a light distribution pattern without the division scan optical system, while FIG. 9B is a diagram illustrating a configuration of the four-division scan optical system and a generated light distribution pattern.

DESCRIPTION OF EMBODIMENT

Figure 1:
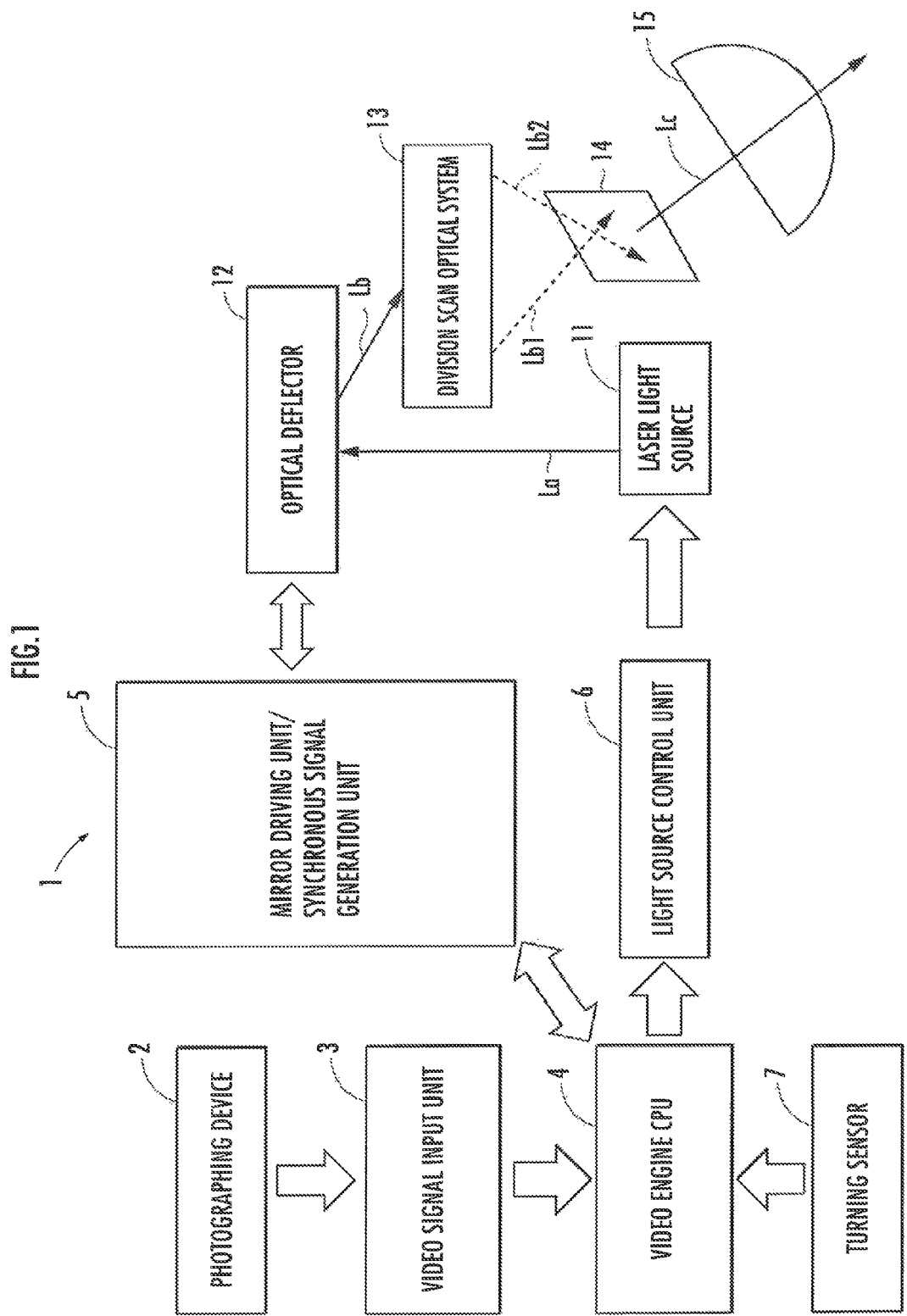
FIG. 1 is a block diagram of a headlight equipped in a vehicle.

FIG. 1 is a block diagram of a headlight 1 equipped in a vehicle. A photographing device 2 is disposed on a front part of the vehicle and photographs a front of the vehicle in a predetermined control cycle and outputs a photographing signal as a video signal. The photographing device 2 is typically an infrared camera or a visible light camera but may be radar. A video signal input unit 3 converts the video signal from the photographing device 2 to a signal that can be processed by a video engine CPU 4 and inputs it to the video engine CPU 4.

The video engine CPU 4 detects presence of a monitoring target such as a pedestrian in a monitoring region or an oncoming vehicle in front of the vehicle on the basis of the video signal from the video signal input unit 3 and if there is a monitoring target, it further detects its position. A turning sensor 7 detects a signal relating to yawing of the vehicle or a steering operation of a driver and inputs it to the video engine CPU 4. The video engine CPU 4 determines whether the vehicle is traveling straight or which of right and left the vehicle is turning to on the basis of an input signal from the turning sensor 7.

The video engine CPU 4 generates a control signal relating to a light distribution pattern of the headlight on the basis of a predetermined target in the monitoring region in front of the vehicle or a turning state of the vehicle. The control signal of the light distribution pattern of the headlight includes information relating to a direction of scan light emitted from the headlight toward an irradiation region and information relating to irradiation performed or irradiation stop and brightness at each scan position.

A mirror driving unit/synchronous signal generation unit 5 (an example of a driving voltage supply unit) receives a control signal relating to a direction of the scan light emitted from the headlight toward the irradiation region from the video engine CPU 4. The mirror driving unit/synchronous signal generation unit 5 controls a driving voltage (an example of a first driving voltage) of a horizontal scan actuator 24 and a driving voltage (an example of a second driving voltage) of a vertical scan actuator 26 as the actuator unit of an optical deflector 12 illustrated in FIG. 2 on the basis of this control signal. The mirror driving unit/synchronous signal generation unit 5 inputs a detection signal (used as a signal for synchronizing an operation of a laser light source 11 with the operation of the optical deflector 12) of an actual rotation angle of the reflection unit 22 from the horizontal scan actuator 24 and the vertical scan actuator 26 of the optical deflector 12 and inputs it to the video engine CPU 4. The video engine CPU 4 determines a direction the scan light has reached from the detection signal of the actual rotation angle of the reflection unit 22 and sends a brightness signal corresponding to the determined direction (scan position) to a light source control unit 6.

The light source control unit 6 receives the control signal of information relating to irradiation performed, irradiation stop, and brightness of the headlight from the video engine CPU 4 and controls on/off of the laser light source 11 and a driving current of the laser light source 11. The larger the driving current is, the stronger (brighter) a laser beam La emitted by the laser light source 11 becomes.

In this embodiment, the driving current of the laser light source 11 is controlled constant, and brightness of the laser beam La (=brightness of the scan light) is normally constant so as to generate a light distribution pattern in FIGS. 5, 6 and the like which will be described later. However, by changing the driving current of the laser light source 11 so as to adjust the brightness of the scan light in accordance with the direction in which the scan light is directed, the light distribution pattern in FIGS. 5, 6 and the like which will be described later can be corrected.

The optical deflector 12 controls a rotation angle of the reflection unit 22 (FIG. 2), that is, an emitting direction of the reflection light Lb on the basis of the driving signal from the mirror driving unit/synchronous signal generation unit 5.

A division scan optical system 13 (an example of the optical system) divides a rotationally moving range of the reflection light Lb incident from the optical deflector 12 into two predetermined rotation angle portions and emits the reflection light Lb included in each of the one and the other rotation angle portions as right scan light Lb1 and left scan light Lb2 to a fluorescent screen 14, respectively. The fluorescent screen 14 is disposed at a position where the right scan light Lb1 and the left scan light Lb2 form an image, and a predetermined fluorescent material which increases a wavelength of incident light and emits it is sealed in a transparent glass plate. As a result, a blue light and an ultraviolet light of the laser beam La from the laser light source 11 changes to white and goes toward a projection lens 15 as a white scan light Lc. If the laser beam La is not blue or ultraviolet light but white light in RGB laser color mixing, a translucent diffusion screen can be used instead of the fluorescent screen 14.

The projection lens 15 emits the white scan light Lc emitted from the division scan optical system 13 toward the irradiation region in front of the vehicle.

Figure 2:
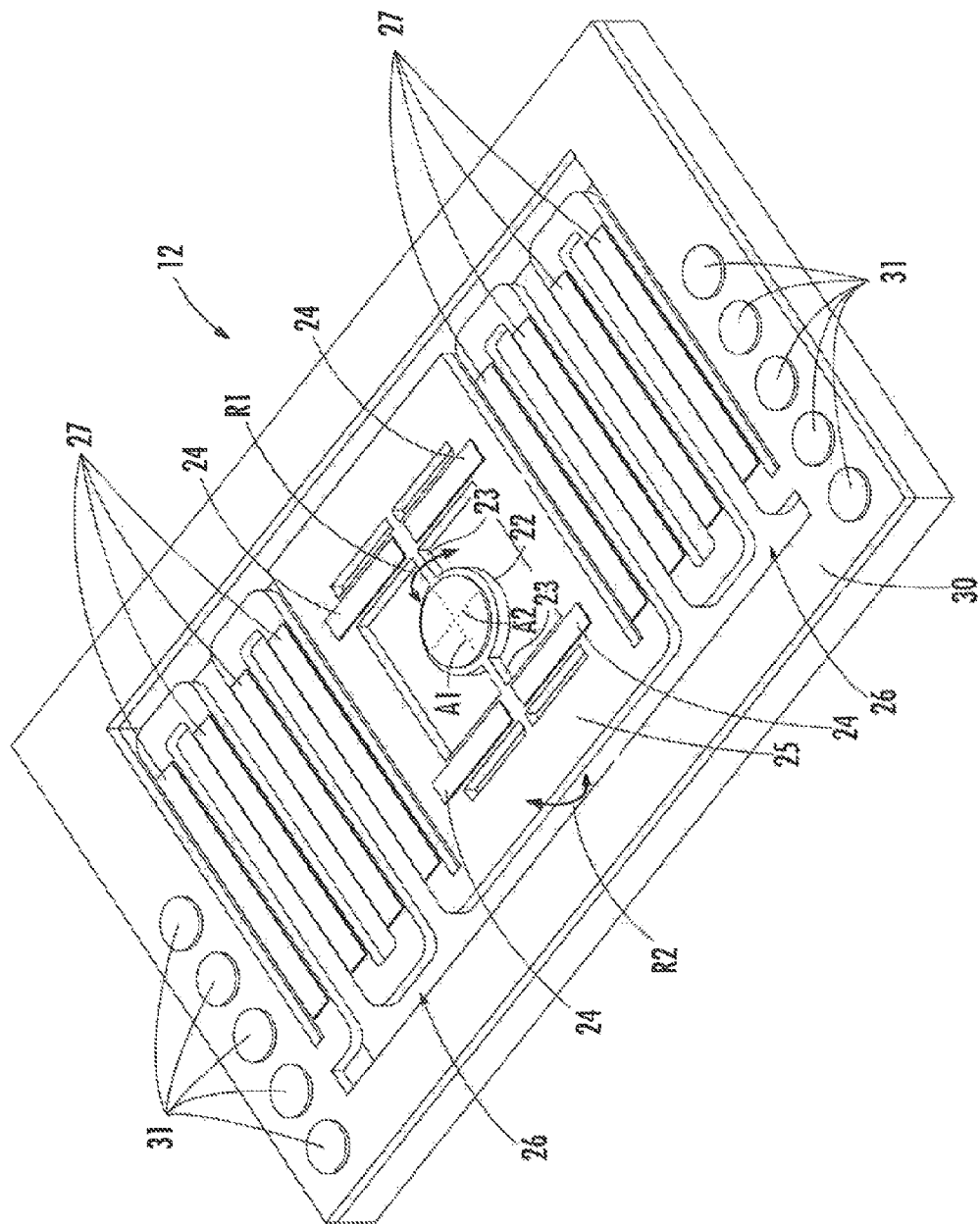
FIG. 2 is a perspective view of an optical deflector.

FIG. 2 is a perspective view of the optical deflector 12. The optical deflector 12 is manufactured by the MEMS technology and includes a circular reflection unit 22, a rectangular movable frame 25 surrounding the reflection unit 22, and a rectangular support frame 30 surrounding the movable frame 25. The reflection unit 22, the movable frame 25, and the support frame 30 are disposed with centers aligned.

The reflection unit 22 has a mirror surface. A rotation axes A1 (an example of a first rotation axis) and A2 (an example of a second rotation axis) are defined on the surface (mirror surface) of the reflection unit 22 for convenience of explanation and are orthogonal to each other at a center of the reflection unit 22. When the optical deflector 12 is in a pause (when the optical deflector 12 is in an operation stop state and the mirror surface is directed straight in front of the optical deflector 12), the rotation axes A1 and A2 are in parallel with a short side and a long side of the support frame 30.

When the optical deflector 12 is equipped on the headlight 1, the rotation axes A1 and A2 are rotation axes around which the reflection unit 22 is rotationally moved for the horizontal (right-and-left direction) scan and the vertical (up-and-down direction) scan, respectively.

A torsion bar 23 extends along the rotation axis A1 on both sides of the reflection unit 22 and is connected to the reflection unit 22 and the movable frame 25 on the both ends.

The four horizontal scan actuators 24 in total extend in parallel with the rotation axis A2 and connect the torsion bar 23 and the movable frame 25. The horizontal scan actuator 24 has a piezoelectric film and performs a curving motion in a thickness direction upon receipt of supply of the driving voltage at a frequency (e.g.: 18 kHz) equal to resonant vibration of the reflection unit 22 to the piezoelectric film and reciprocating and rotationally moves the torsion bar 23 around the rotation axis A1. The reflection unit 22 reciprocates and rotationally moves around the rotation axis A1 in a horizontal rotationally moving direction R1 with reciprocating and rotational movement of the torsion bar 23 around the rotation axis A1.

The vertical scan actuator 26 is disposed on both sides of the movable frame 25 in a long side direction of the support frame 30, is interposed between the movable frame 25 and the support frame 30 and supports the movable frame 25 on the support frame 30. The vertical scan actuator 26 includes a plurality of cantilevers 27 arrayed in a meander pattern and connected in a series. The cantilever 27 is of a piezoelectric type and is supplied with a driving voltage at a frequency (e.g.: 60 Hz) lower than the resonant vibration of the reflection unit 22.

Assuming that the cantilevers 27 are numbered from the one which is the closest to the movable frame 25 as 1 to 4, the driving voltage supplied to the cantilever 27 is the same in an effective value and a frequency for all the cantilevers 27, but phases are set such that the phases of the cantilevers 27 in even numbers are opposite to the phases of the cantilevers 27 in odd numbers. As a result, the cantilevers 27 adjacent to each other are curved in directions opposite to each other and reciprocating and rotationally move the movable frame 25 around a rotation axis passing through a center of the reflection unit 22 and in parallel with the long side of the support frame 30. As a result, the reflection unit 22 is reciprocated and rotationally moved in a vertical rotationally moving direction R2 around the rotation axis A2.

Electrode pads 31 are formed in plural on surfaces of short side portions on the both sides of the support frame 30 and are connected to the piezoelectric films of the horizontal scan actuators 24 and the cantilevers 27 through wiring inside the optical deflector 12.

FIG. 3 illustrates the driving voltage supplied to the horizontal scan actuator 24 or the cantilever 27. The waveform in FIG. 3 illustrates only a feature of the waveform and does not explicitly indicate specific numerical values of the frequency and the voltage. FIG. 3A is an example of a sinusoidal wave and FIG. 3B is an example of a sawtooth wave. Deformation speeds of the horizontal scan actuators 24 and the cantilevers 27, that is, reciprocating/rotationally moving speeds of the reflection unit 22 around the rotation axis A1 or the rotation axis A2 are in proportion to a temporal change of the driving voltages of the horizontal scan actuators 24 and the cantilevers 27. The driving voltages with the sinusoidal wave and the sawtooth wave both have low changing speeds at both end portions of a change range (maximum value and minimum value) and high changing speeds at a center part in the change range.

On the other hand, the both end portions of the driving voltage correspond to rotation angles at both ends of the rotation angle range of the reciprocating and rotational movement of the reflection unit 22 in a horizontal rotationally moving direction R1 around the rotation axis A1 and the vertical rotationally moving direction R2 around the rotation axis A2. Moreover, the center part of the driving voltage corresponds to a rotation angle at the center part on both ends of the rotation angle range of the reciprocating rotational movement of the reflection unit 22 around the rotation axis A1 or the rotation axis A2.

Figure 4:
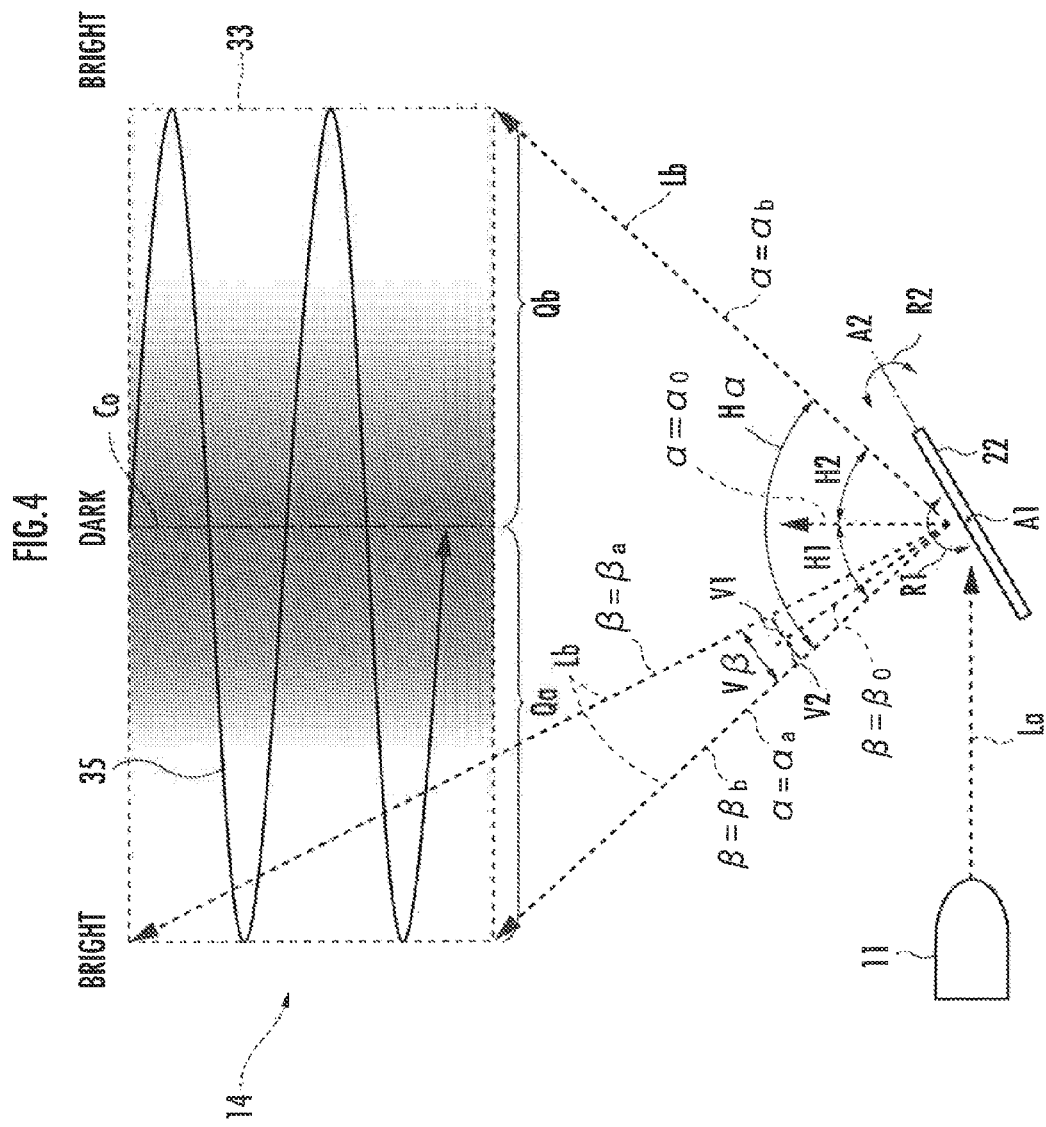
FIG. 4 is a diagram illustrating an optical path and a light distribution pattern when reflection light from a reflection unit of the optical deflector is directly irradiated to an image forming surface of a fluorescent screen.

FIG. 4 illustrates a light distribution pattern when the reflection light Lb from the reflection unit 22 of the optical deflector 12 is irradiated to an image forming surface 33 of the fluorescent screen 14 directly, that is, without passing through the division scan optical system 13 in FIG. 1. In the light distribution pattern diagram in FIG. 4 and after, the supply voltage of the laser light source 11 is maintained constant so that the intensity of the laser beam (luminosity or brightness) is maintained constant.

In FIG. 4, the reflection light Lb reciprocates and scans in the horizontal direction within a horizontal scan angle range Hα and also reciprocates and scans in the vertical direction within a vertical scan angle range Vβ. The rotation angle range (an example of the first rotation angle range) around the rotation axis A1 of the reflection unit 22 and the rotation angle range (an example of the second rotation angle range) around the rotation axis A2 mean the rotation angle ranges around the rotation axes A1 and A2 with respect to a normal line at a center point of the reflection unit 22, respectively. The horizontal scan angle range Hα means a range of an emission angle when the laser beam La enters from one side to the normal line of the reflection unit 22 and the reflection light Lb is reflected to the other side with respect to the normal line. Therefore, the rotation angle range of the reflection unit 22 around the rotation axis A1 and the horizontal scan angle range Hα have a predetermined relation but do not have the same value. Similarly, the rotation angle range of the reflection unit 22 around the rotation axis A2 and the vertical scan angle range Vβ have a predetermined relation but do not have the same value.

In the horizontal scan angle range Hα, an angle α at the center is αo, and angles α at the left end and the right end in the horizontal direction are αa (an example of a scan angle corresponding to the one end angle of the first rotation angle range) and αb (an example of a scan angle corresponding to the other end angle of the first rotation angle range), respectively. The horizontal scan angle range Hα is divided into a left-side scan angle range portion H1 (a scan angle range portion corresponding to the first angle portion) and a right-side scan angle range portion H2 (a scan angle range portion corresponding to the second angle portion) at the center angle αo (an example of a scan angle corresponding to the intermediate angle of the first rotation angle range) as a boundary. A left-and-right center line Co is set as a center line in left and right of the image forming surface 33 and is an irradiation point on the image forming surface 33 by the reflection light Lb advancing along the center angle αo.

In a range of the vertical scan angle range Vβ, center angles β are βo (an example of a scan angle corresponding to another intermediate angle) and vertical upper end and lower end angles β are βa (an example of a scan angle corresponding to another one end angle) and βb (an example of a scan angle corresponding to yet another end angle), respectively. The vertical scan angle range Vβ is divided into an upper-side scan angle range portion V1 (a scan angle range portion corresponding to the third angle portion) and a lower-side scan angle range portion V2 (a scan angle range portion corresponding to the fourth angle portion) at the center angle βo as a boundary.

FIG. 4 is a light distribution pattern when the reflection light Lb from the reflection unit 22 of the optical deflector 12 is irradiated to the fluorescent screen 14 as it is. On the image forming surface 33, a scan track 35 by the reflection light Lb is continuously formed. The scan track 35 is scanned in the vertical direction by reversing the direction at both ends of the image forming surface 33 in the horizontal direction. In FIG. 4, a light distribution pattern portion Qa on the left side with respect to the left-and-right center line Co is irradiated with the reflection light Lb of the scan angle range portion H1, while a light distribution pattern portion Qb on the right side with respect to the left-and-right center line Co is irradiated with the reflection light Lb of the scan angle range portion H2.

The reflection light Lb when the rotationally moving speed in the horizontal rotationally moving direction R1 around the rotation axis A1 is low is irradiated to the left end portion of the light distribution pattern portion Qa and the right end portion of the light distribution pattern portion Qb as both end portions of the image forming surface 33 in the horizontal direction. The reflection light Lb when the rotationally moving speed in the horizontal direction R1 around the rotation axis A1 is high is irradiated to the right end portion of the light distribution pattern portion Qa and the left end portion of the light distribution pattern portion Qb as left-and-right center line Co. As a result, the both end portions of the image forming surface 33 in the horizontal direction become bright, while the left-and-right center line Co as the center part becomes dark in the light distribution pattern. This light distribution pattern is opposite to the light distribution pattern desired for the headlight 1.

Figure 5:
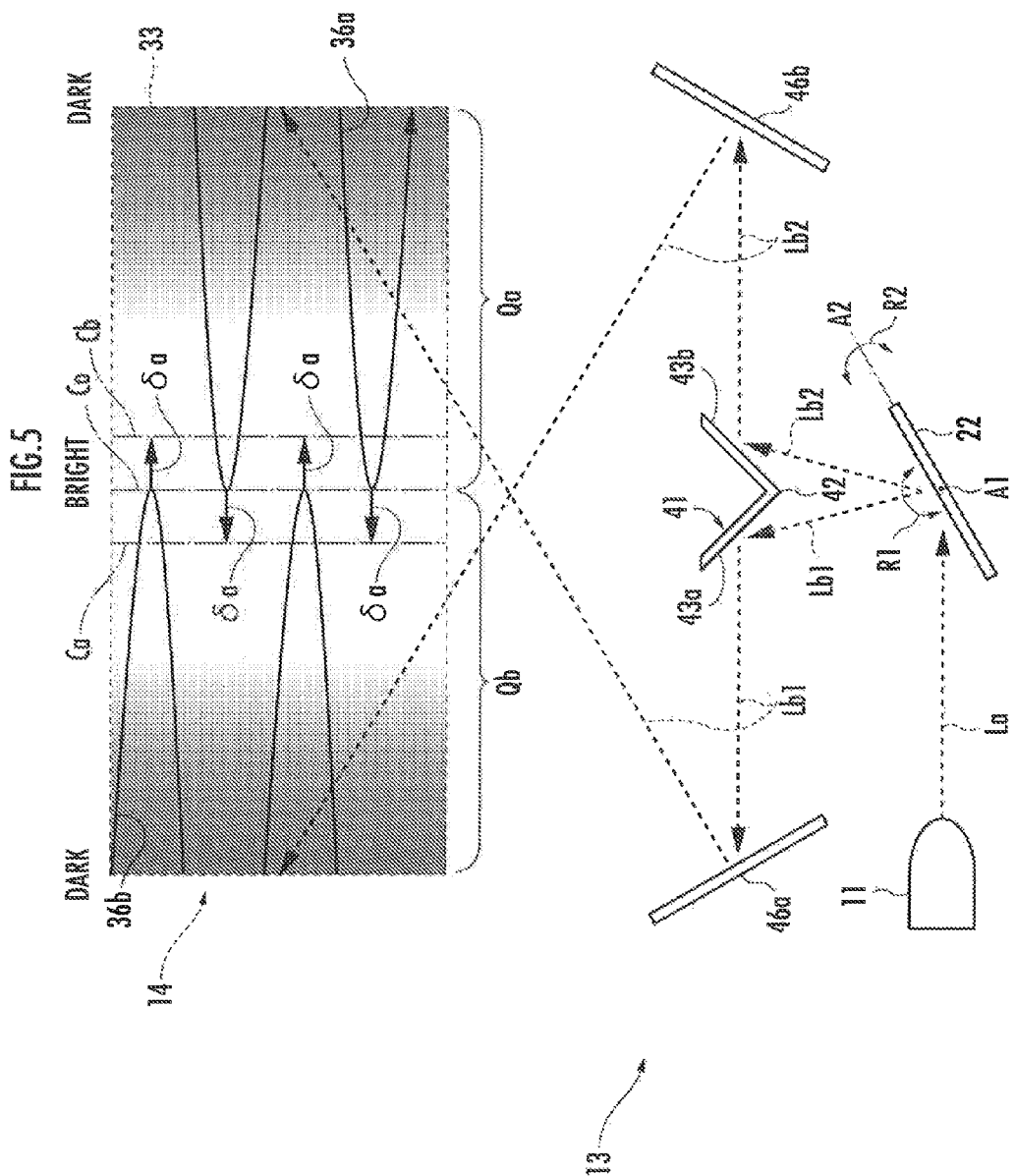
FIG. 5 is a diagram illustrating the optical path and the light distribution pattern when the reflection light from the reflection unit of the optical deflector is irradiated to the image forming surface of the fluorescent screen via a division scan optical system.

FIG. 5 illustrates a light distribution pattern generated on the image forming surface 33 of the fluorescent screen 14 when the division scan optical system 13 is interposed between the optical deflector 12 and the fluorescent screen 14. A V-shaped mirror 41 having a V-shaped section (an example of a dividing unit) is arranged with symmetrical left and right surfaces aligned with the center angle αo (FIG. 4), and a top point 42 is located on the symmetrical left and right surfaces and has a mirror surface 43a and a mirror surface 43b on both sides with the top point 42 as a boundary. As a result, the right scan light Lb1 of the scan angle range portion H1 (FIG. 4) from the reflection unit 22 enters the mirror surface 43a, while the left scan light Lb2 of the scan angle range portion H2 enters the mirror surface 43b. When the right scan light Lb1 and the left scan light Lb2 are collectively called, it is a "scan light Lb".

A mirror 46a for right irradiation (an example of the right-side scan light generation unit and the mirror for the first angle portion) and a mirror 46b for left irradiation (an example of the left-side scan light generation unit and the mirror for the second angle portion) are disposed on left and right with respect to the V-shaped mirror 41, respectively.

To the mirror 46a for right irradiation, the right scan light Lb1 of the scan angle range portion H1 reflected from the mirror surface 43a of the V-shaped mirror 41 is incident and is reflected toward the region portion where the light distribution pattern portion Qa as the right-side region portion in FIG. 5 is generated with respect to the left-and-right center line Co on the image forming surface 33. At that time, the right scan light Lb1 derived of the reflection light Lb whose angle α is the closer to αa advances on the left side in the horizontal direction.

To the mirror 46b for left irradiation, the left scan light Lb2 of the scan angle range portion H2 reflected from the mirror surface 43b of the V-shaped mirror 41 is incident and is reflected toward the region portion where the light distribution pattern portion Qb as the left-side region portion in FIG. 5 is generated with respect to the left-and-right center line Co on the image forming surface 33. At that time, the left scan light Lb2 derived of the reflection light Lb whose angle α is the closer to αb advances on the right side in the horizontal direction.

Thus, the light distribution pattern portions Qa and Qb generated on the left side and the right side with respect to the left-and-right center line Co on the image forming surface 33 in FIG. 4 is generated on the image forming surface 33 in FIG. 5 with the an opposite left-and-right relation. As a result, on the image forming surface 33 in FIG. 5, a light distribution pattern is generated in which the both end portions of the image forming surface 33 in the horizontal direction are dark and the left-and-right center line Co as the center part is bright.

In FIG. 5, a boundary line Ca is obtained by moving a left-end boundary line of the light distribution pattern portion Qa from the left-and-right center line Co to the left by a shift amount δa. A boundary line Cb is obtained by moving a right-end boundary line of the light distribution pattern portion Qb from the left-and-right center line Co to the right by a shift amount δa. The light distribution pattern portion Qa and the light distribution pattern portion Qb abut each other at the left-and-right center line Co, but the light distribution pattern portion Qa and the light distribution pattern portion Qb can be partially overlapped with each other in the horizontal direction. This overlap is realized by increasing the amplitude of the driving voltage with the sinusoidal wave in FIG. 3A while the center voltage is maintained. The larger the increase amount of the amplitude is, the larger the shift amount δa increases. The brightness at the center part can be adjusted by adjusting an overlap amount (=2·δa).

The video engine CPU 4 turns off the laser light source 11 during a scan period of the right scan light Lb1 between the boundary line Ca and the left-and-right center line Co for the light distribution pattern portion Qa and turns off the laser light source 11 during a scan period of the left scan light Lb2 between the left-and-right center line Co and the boundary line Cb for the light distribution pattern portion Qb so that the brightness between the boundary lines Ca-Cb of the light distribution pattern can be adjusted.

Figure 6:
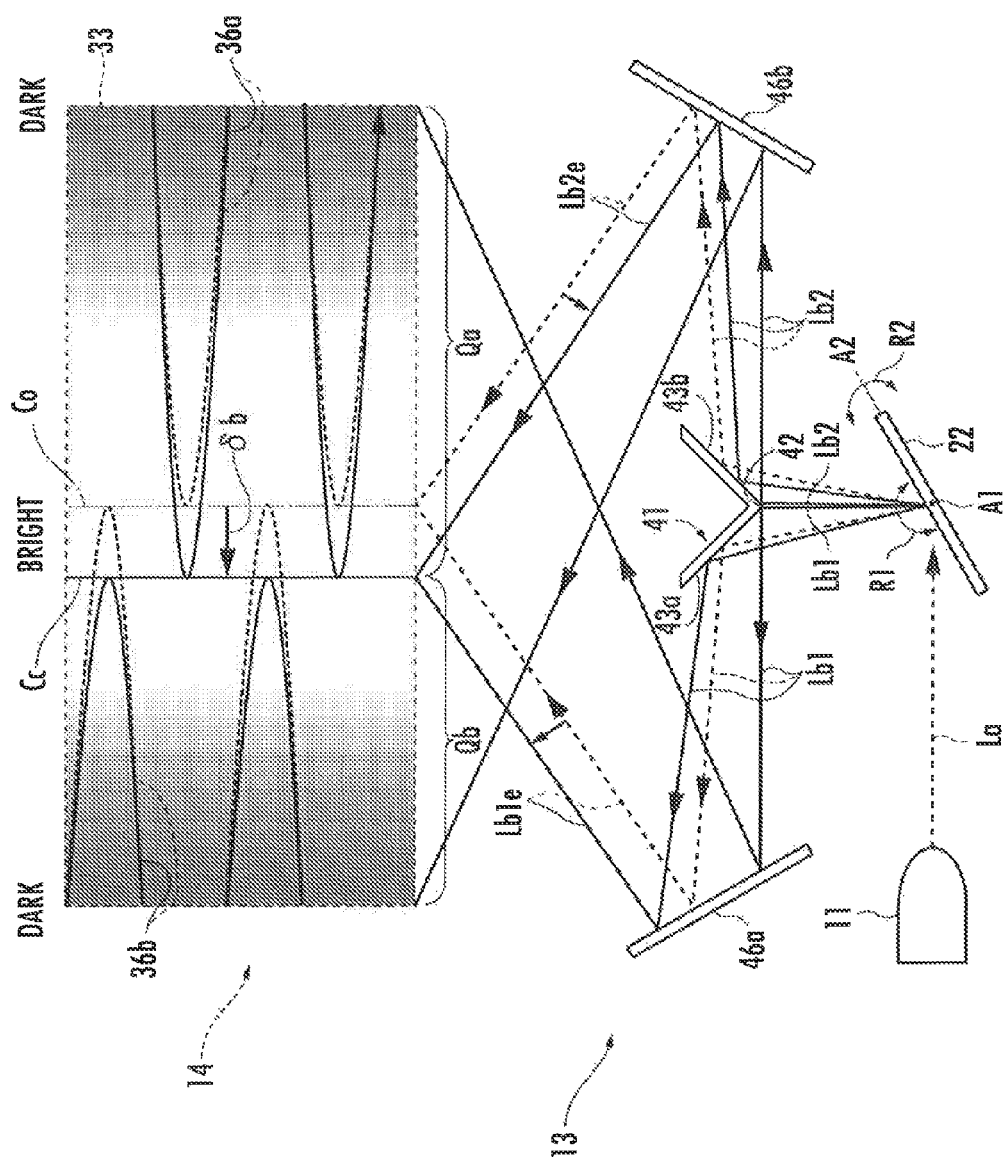
FIG. 6 is a diagram illustrating the light distribution pattern and the optical path used when an automobile is turning.

FIG. 6 illustrates an example of the light distribution pattern used when an automobile makes a turn. FIG. 7 illustrates a waveform of the driving voltage supplied to the piezoelectric film of the horizontal scan actuator 24 for obtaining the light distribution pattern in FIG. 6. The sinusoidal wave is used for the waveform of the driving voltage whether the automobile is traveling straight or making a turn.

When the automobile is turning to the left direction, the driving voltage is lowered by a predetermined amount with respect to the driving voltage during straight traveling. As a result, the rotation angle range of the reflection unit 22 in the horizontal rotationally moving direction R1 around the rotation axis A1 is shifted to a rotation angle decreasing direction, and in the V-shaped mirror 41, the scan angle range portion H1 of the right scan light Lb1 reflected by the mirror surface 43a increases, while the scan angle range portion H2 of the left scan light Lb2 reflected by the mirror surface 43b decreases. As a result, as illustrated in FIG. 6, a boundary line Cc between the light distribution pattern portion Qa and the light distribution pattern portion Qb is moved from the left-and-right center line Co to the left by the shift amount δb. That is, a portion with maximum luminosity (maximum brightness) is displaced to the boundary line Cc shifted from the left-and-right center line Co to the left by δb in the horizontal direction on the image forming surface 33.

Since the left-and-right center line Co is located on a center line of a vehicle width of the automobile, by means of the shift to the left to the boundary line Cc as the portion with the maximum luminosity on the image forming surface 33, the left side as an advance side of the automobile with respect to the vehicle width center line in the irradiation region can be brightly irradiated.

On the other hand, when the automobile is turning to the right direction, the driving voltage is increased by a predetermined amount with respect to the driving voltage during straight traveling. As a result, the rotation angle range of the reflection unit 22 in the horizontal rotationally moving direction R1 around the rotation axis A1 is shifted to a rotation angle increasing direction, and in the V-shaped mirror 41, the scan angle range portion H2 of the left scan light Lb2 reflected by the mirror surface 43 increases, while the scan angle range portion H1 of the right scan light Lb1 reflected by the mirror surface 43a decreases. As a result, to the contrary to that illustrated in FIG. 6, the boundary line Cc between the light distribution pattern portion Qa and the light distribution pattern portion Qb is moved to the right with respect to the left-and-right center line Co. As a result, the right side as the advance side of the automobile with respect to the vehicle width center line can be brightly irradiated.

FIG. 8 is a configuration diagram of another division scan optical system 49. In the division scan optical system 49, the same element as the elements in the division scan optical system 13 are given the same reference numerals and explanation will be omitted, and differences from the division scan optical system 13 will be described.

In the division scan optical system 49 in FIG. 8, instead of the V-shaped mirror 41, the mirror 46a for right irradiation, and the mirror 46b for left irradiation of the division scan optical system 13, a prism 50 having a diamond section is used. The prism 50 is formed having a diamond cross-section in which two half portions 52a and 52b are combined on a joint surface 51 and has functions of a dividing unit, a right-side scan light generation unit, and a left-side scan light generation unit. The joint surface 51 is located on a boundary surface dividing into the right scan light Lb1 of the scan angle range portion H1 (FIG. 4) from the reflection unit 22 and the left scan light Lb2 of the scan angle range portion H2 similarly to the top point 42 (FIG. 5) of the V-shaped mirror 41.

As a result, the right scan light Lb1 of the scan angle range portion H1 (FIG. 4) from the reflection unit 22 enters the reflection unit 22 side of the half portion 52a, advances by being refracted through the half portion 52a and is emitted from the fluorescent screen 14 side to a region portion on the right side with respect to the left-and-right center line Co of the fluorescent screen 14. The left scan light Lb2 of the scan angle range portion H2 (FIG. 4) from the reflection unit 22 enters the reflection unit 22 side of the half portion 52b, advances by being refracted through the half portion 52b and is emitted from the fluorescent screen 14 side to a region portion on the left side with respect to the left-and-right center line Co of the fluorescent screen 14.

Thus, the light distribution pattern portions Qa and Qb generated on the left side and the right side with respect to the left-and-right center line Co on the image forming surface 33 in FIG. 4 is generated on the image forming surface 33 in FIG. 8 with the opposite left-and-right relation. As a result, on the image forming surface 33 in FIG. 8, too, similarly to the light distribution pattern by the division scan optical system 13 in FIG. 5, the light distribution pattern in which the both end portions of the image forming surface 33 in the horizontal direction are dark, while the left-and-right center line Co as the center part is bright is generated.

FIG. 9A and FIG. 9B are explanatory views of a four-division scan optical system 60. FIG. 9A illustrates a light distribution pattern when the reflection light Lb from the reflection unit 22 of the optical deflector 12 is irradiated to the image forming surface 33 of the fluorescent screen 14 similarly to FIG. 4 directly, that is, without passing through the four-division scan optical system 60 in FIG. 9B. FIG. 9B illustrates a light distribution pattern generated on the image forming surface 33 of the fluorescent screen 14 when the four-division scan optical system 60 is interposed between the optical deflector 12 and the fluorescent screen 14.

In FIG. 9A, the light distribution pattern portion Qa and the light distribution pattern portion Qb are the same as the light distribution pattern portions Qa and Qb defined in FIG. 4. That is, the left side light distribution pattern portion Qa with respect to the left-and-right center line Co is generated by the reflection light Lb of the scan angle range portion H1, and the right side light distribution pattern portion Qb with respect to the left-and-right center line Co is generated by the reflection light Lb of the scan angle range portion H2.

In FIG. 9A, light distribution pattern portions Qc and Qd are newly defined, and the upper side light distribution pattern portion Qc with respect to an up-and-down center line Ch is irradiated with the reflection light Lb of a scan angle range portion V1 (FIG. 4), while the lower side light distribution pattern portion Qd with respect to the up-and-down center line Ch is irradiated with the reflection light Lb of a scan angle range portion V2 (FIG. 4).

In FIG. 9A, the image forming surface 33 is divided into four light distribution pattern portions, that is, upper left, lower left, upper right and lower right by the left-and-right center line Co and the up-and-down center line Ch. In order to identify the four light distribution pattern portions, reference characters are given such that the upper left distribution pattern portion is Qac, the lower left light distribution pattern portion is Qad, the upper right light distribution pattern portion is Qbc, and the lower right light distribution pattern portion is Qbd in explanation.

A scan track 70a1 is generated in the light distribution pattern portion Qac, a scan track 70a2 is generated in the light distribution pattern portion Qad, a scan track 70b1 is generated in the light distribution pattern portion Qbc, and a scan track 70b2 is generated in the light distribution pattern portion Qbd. These scan tracks are continuous on the image forming surface 33 in FIG. 9A.

In FIG. 9A, to the light distribution pattern portion Qac, the reflection light Lb belonging to both the scan angle range portions H1 and V1 (light distribution pattern portions Qa and Qc) is incident. To the light distribution pattern portion Qad, the reflection light Lb belonging to both the scan angle range portions H1 and V2 (light distribution pattern portions Qa and Qd) is incident. To the light distribution pattern portion Qbc, the reflection light Lb belonging to both the scan angle range portions H2 and V1 (light distribution pattern portions Qb and Qc) is incident. To the light distribution pattern portion Qbd, the reflection light Lb belonging to both the scan angle range portions H2 and V2 (light distribution pattern portions Qb and Qd) is incident.

In FIG. 9B, in the four-division scan optical system 60, instead of the V-shaped mirror 41, the mirror 46a for right irradiation, and the mirror 46b for left irradiation of the division scan optical system 13, a square pyramid mirror 61 having four side surfaces as reflective surfaces is provided. In FIG. 9B, the square pyramid mirror 61 is described in a plan view, but in actual arrangement in the four-division scan optical system 60, a center line of the square pyramid mirror 61 (perpendicular line drawn from a top point 62 to a bottom surface) is present on the center angle $\alpha o$ of the horizontal scan angle range $H\alpha$ and the center angle $\beta o$ of the vertical scan angle range $V\beta$ (FIG. 4). On each side surface of the square pyramid mirror 61, a reflective surface 63a1 (an example of a lower-side scan light generation unit), a reflective surface 63a2 (an example of an upper-side scan light generation unit), a reflective surface 63b1 (an example of a lower-side scan light generation unit), and a reflective surface 63b2 (an example of an upper-side scan light generation unit) with predetermined profiles are set, and these reflective surfaces 63a1, 63a2, 63b1, and 63b2 correspond to the upper left light distribution pattern portion Qac, the lower left light distribution pattern portion Qad, the upper right light distribution pattern portion Qbc, and the lower right light distribution pattern portion Qbd in FIG. 9A.

The right scan light Lb1a of the light distribution pattern portion Qac of the reflective surface 63a1 advances to a mirror 66a1 for lower right irradiation, is reflected on the mirror 66a1 for lower right irradiation, and is irradiated to the lower right region portion (a region portion which is the right-side region portion and also the lower-side region portion) on the image forming surface 33. The right scan light Lb1b of the light distribution pattern portion Qad of the reflective surface 63a2 advances to a mirror 66a2 for upper right irradiation, is reflected on the mirror 66a2 for upper right irradiation, and is irradiated to the upper right region portion (a region portion which is the right-side region portion and also the upper-side region portion) on the image forming surface 33.

The left scan light Lb2a of the light distribution pattern portion Qbc of the reflective surface 63b1 advances to a mirror 66b1 for lower left irradiation, is reflected on the mirror 66b1 for lower left irradiation, and is irradiated to the lower left region portion (a region portion which is the left-side region portion and also the lower-side region portion) on the image forming surface 33. The left scan light Lb2b of the light distribution pattern portion Qbd of the reflective surface 63b2 advances to a mirror 66b2 for upper left irradiation, is reflected on the mirror 66b2 for upper left irradiation, and is irradiated to the upper left region portion (a region portion which is the left-side region portion and also the upper-side region portion) on the image forming surface 33.

In the scan lights Lb1a and Lb2a emitted from the mirror 66a1 for lower right irradiation and the mirror 66b1 for lower left irradiation, the scan lights Lb1a and Lb2a derived of the reflection lights Lb1 and Lb2 whose angles $\beta$ (FIG. 4) are closer to $\beta a$ advance on the upper side in the vertical direction. In the scan lights Lb1b and Lb2b emitted from the mirror 66a2 for upper right irradiation and the mirror 66b2 for upper left irradiation, the scan lights Lb1b and Lb2b derived of the reflection lights Lb1 and Lb2 whose angles $\beta$ (FIG. 4) are closer to $\beta b$ advance on the lower side in the vertical direction.

As a result, the light distribution patterns Qbd, Qbc, Qad, and Qac in the upper left, the lower left, the upper right, and the lower right ranges divided into four parts by the left-and-right center line Co and the up-and-down center line Ch occupy the image forming surface 33 in FIG. 9B without a gap or overlap. As a result, on the image forming surface 33 in FIG. 9B, the light distribution pattern in which the center part is bright and left and right as well as upper and lower peripheral parts are dark.

In the embodiment in the aforementioned FIGS. 6 and 7, the driving voltage of the horizontal scan actuator 24 is described, but the driving voltage in FIG. 7 can be also applied as the driving voltage of the vertical scan actuator 26 in the four-division scan optical system 60 in FIG. 9B. In that case, since the horizontal direction in FIG. 6 is replaced by the vertical direction in FIG. 9B, the rightward movement of the portion with the maximum luminosity at a right turn in FIG. 6 changes to downward movement in FIG. 9, and the light distribution pattern suitable for a low beam is generated. Moreover, the leftward movement of the portion with the maximum luminosity at a left turn in FIG. 6 changes to upward movement in FIG. 9 and the light distribution pattern suitable for a high beam is generated.

INDUSTRIAL APPLICABILITY

The headlight of the present invention is not limited to a headlight of an automobile but can be employed also as a headlight of a railway vehicle or a vehicle such as a motorcycle and other movable bodies such as a small-sized boat, a mobile robot and the like.

The invention claimed is:
1. A headlight comprising:
a light source;
an optical deflector which has a reflection unit which reflects light from the light source and an actuator unit driven by first and second driving voltages and reciprocating and rotationally moving the reflection unit around orthogonal first and second rotation axes, the optical deflector emitting reflection light while reciprocating and rotationally moving the reflection light from the reflection unit within first and second rotation angle ranges by rotational movement of the reflection unit around the first and second rotation axes; and
an optical system which emits the reflection light emitted from the optical deflector within the first and second rotation angle ranges as scan light which scans an irradiation region in a horizontal direction and a vertical direction, wherein
the optical system has a dividing unit which divides the reflection light within the first rotation angle range into reflection light of a first angle portion from one end angle to an intermediate angle of the first rotation angle range and reflection light of a second angle portion from the intermediate angle to the other end angle of the first rotation angle range;
a right-side scan light generation unit which advances the reflection light which is the closer to the one end angle in the reflection light of the first angle portion on a left side in the horizontal direction and emits the light as scan light which scans a right-side region portion of the irradiation region in the horizontal direction; and a left-side scan light generation unit which advances the reflection light which is the closer to the other end angle in the reflection light of the second angle portion on a right side in the horizontal direction and emits the light as the scan light which scans a left-side region portion of the irradiation region in the horizontal direction.

2. The headlight according to claim 1, wherein the dividing unit is a V-shaped mirror which reflects the reflection light of the first angle portion by one of reflective surfaces and reflects the reflection light of the second angle portion by the other reflective surface;

the right-side scan light generation unit is a mirror for the first angle portion which reflects the reflection light from the one reflective surface of the V-shaped mirror toward the right-side region portion; and the left-side scan light generation unit is a mirror for the second angle portion which reflects the reflection light from the other reflective surface of the V-shaped mirror toward the left-side region portion.

3. The headlight according to claim 1, further comprising:

a prism having a diamond sectional shape, wherein one of half portions of the diamond sectional shape in the prism has the reflection light of the first angle portion from the optical deflector incident thereto and refracts the incident reflection light inside and emits it toward the right-side region portion so as to serve both as the dividing unit and the right-side scan light generation unit; and the other half portion of the diamond sectional shape in the prism has the reflection light of the second angle portion from the optical deflector incident, and refracts the incident reflection light inside and emits it toward the left-side region portion so as to serve both as the dividing unit and the left-side scan light generation unit.

4. The headlight according to claim 1, wherein the intermediate angle is set to a rotation angle at a center of the first rotation angle range.

5. The headlight according to claim 1, wherein the first driving voltage is a sinusoidal wave, and a driving voltage supply unit is provided for adjusting a center voltage and amplitude of the first driving voltage and supplying the voltage to the actuator unit.

6. The headlight according to claim 1, wherein the optical system has:

another dividing unit which divides the reflection light within the second rotation angle range into reflection light of a third angle portion from another one end angle to another reflection light intermediate angle of the second rotation angle range and a fourth angle portion from the other intermediate angle to yet another angle of the second rotation angle range;

a lower-side scan light generation unit which advances the reflection light of the third angle portion which is the closer to the other one end angle on an upper side in a vertical direction and emits the light as scan light which scans a lower-side region portion of the irradiation region in the vertical direction; and an upper-side scan light generation unit which advances the reflection light of the fourth angle portion which is the closer to the yet another end angle on a lower side in a vertical direction and emits the light as scan light which scans an upper-side region portion of the irradiation region in the vertical direction.

7. The headlight according to claim 6, wherein the second driving voltage is a sinusoidal wave or a sawtooth wave, and another driving voltage supply unit which adjusts a center voltage and amplitude of the second driving voltage and supplies the voltage to the actuator unit is provided.

\* \* \* \* \*